Figure 1:
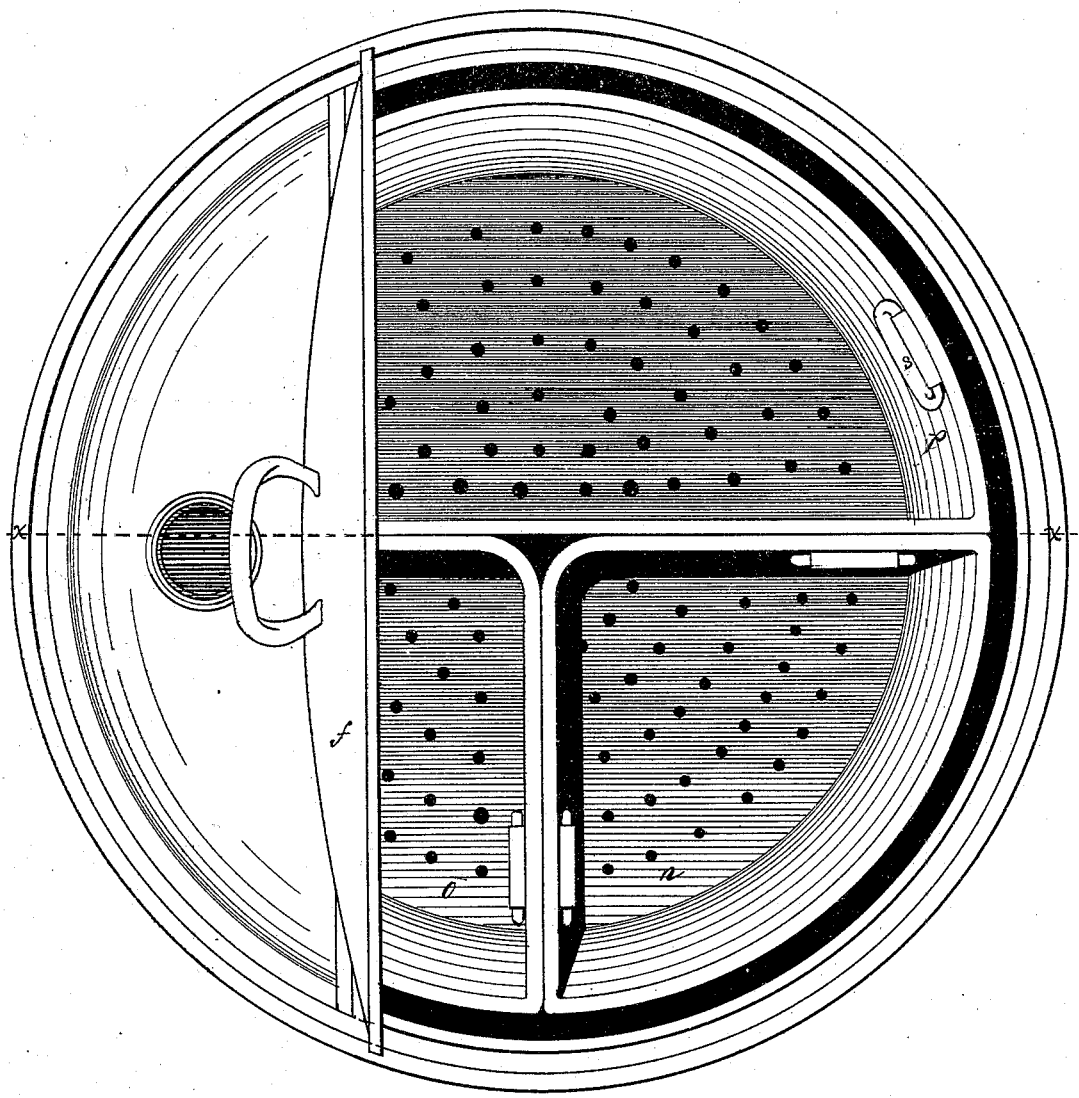

2 Sheets—Sheet 1.

G. W. WALKER.
CULINARY-KETTLE.

No. 173,697. Patented Feb. 15, 1876.

Witnesses.
E. H. Latimer.
W. J. Pratt.

Inventor.
Geo W Walker
per Crosby Gregory
Atty's.

N. PETERS, PHOTO-LITHOGRAPHER, WASHINGTON, D. C.

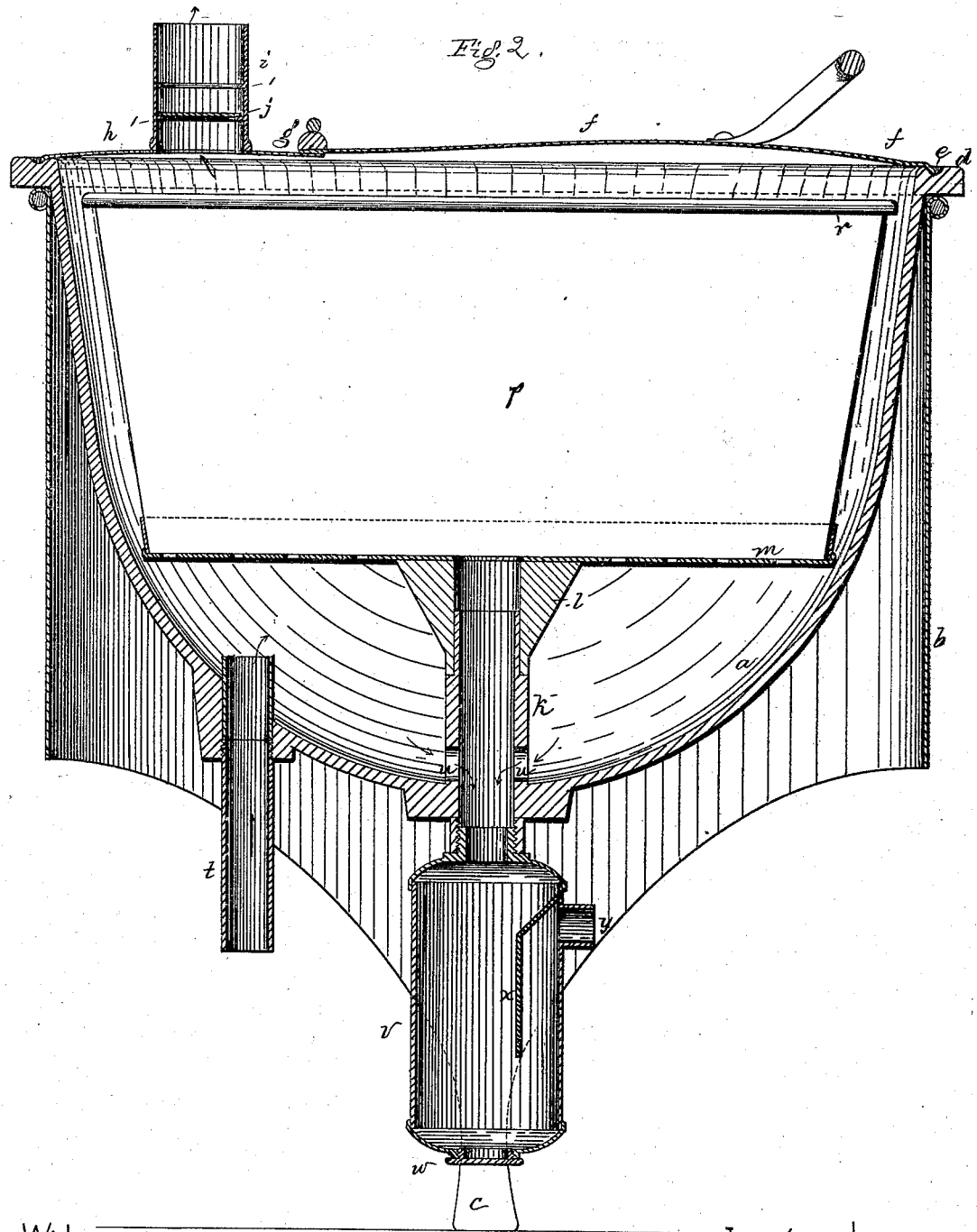

UNITED STATES PATENT OFFICE.

GEORGE W. WALKER, OF MALDEN, MASSACHUSETTS.

IMPROVEMENT IN CULINARY KETTLES.

Specification forming part of Letters Patent No. 173,697, dated February 15, 1876; application filed January 29, 1876.

*To all whom it may concern:*

Be it known that I, GEORGE W. WALKER, of Malden, in the county of Middlesex and State of Massachusetts, have invented an Improvement in Culinary Kettles, of which the following is a specification:

This invention relates to kettles connected preferably with a suitable steam generator or apparatus, and designed for culinary purposes by the action of steam or hot water.

The object of my invention is to provide kettles with rotating supports, to sustain dishes or pans containing articles to be cooked or warmed.

Figure 1 is a top view with the cover open, and Fig. 2 is a section on lines $x$ $x$, Fig. 1, with cover closed.

The kettle-body $a$, of proper shape and size, is sustained in this instance by the support $b$, provided with legs, $c$, the flange $d$ of the kettle resting on the top of the case, and being preferably provided with a grooved portion, $e$, to receive the projecting flange on the lower side of the cover $f$, hinged at $g$, so that access may be had to the interior of the kettle, and the flange of the lid, when the lid is closed, prevents the escape of the steam, or the odor of the things being cooked. A stationary part, $h$, of the cover has a pipe, $i$, provided with a loose valve, $j$, shown as contained between two shoulders, 1 1, and when the pressure of steam or gases is too great, the valve is raised and the steam or gas escapes through $i$, and may be led to any desired spot by a suitable pipe.

Water of condensation settles in the groove $e$, and, acting as an ordinary water-joint, prevents the escape of steam, but if the pressure was sufficient the water would be forced from this joint by the steam, and to obviate this I provide the kettle with the valve just described, but the valve might be differently constructed, the only thing requisite being that it shall lift under a certain pressure, and the valve may therefore be of any well-known construction adapted for the purpose.

A standard, $k$, is shown as rising from the bottom of the kettle, and it receives a projection, $l$, on the bottom of the rotating support $m$, preferably perforated and adapted to sustain the pans $n$ $o$ $p$, or suitable or well-known dishes used to contain articles or materials to be steamed, cooked, or kept warm, the dish-support being movable to enable either pan or dish to be easily turned to the front in order to be removed, or to have its contents removed, the rotation of the dish or pan support being of great convenience, specially as the pans or dishes are often heavy, making it difficult to push them about on a stationary shelf, and it is often very inconvenient to reach over a kettle to remove a dish or pan at the back portion of the kettle, as is commonly done with kettles without my improved rotary support.

This rotating support need not necessarily be a flat disk, but may be provided with openings in which the pans or dishes may be set, and instead of supporting the pans or dishes from their bottoms, they may be supported from their sides or from their rims or flanges $r$, or by means of hooks on the rotating support adapted to receive the rings $s$ or equivalent on the pans or dishes.

The construction of the rotating support may be varied without departing from the invention, for I am not aware that pans or dishes have ever been supported within a kettle by means of a rotating support.

The steam is admitted through a pipe, $t$, connected with the bottom or other part of the kettle, and water of condensation and other waste passes through the openings $u$ down into a chamber, $v$, preferably made detachable from the kettle, and provided with a plugged opening, $w$, a diaphragm, $x$, and an escape-pipe, $y$. Waste liquids will escape from pipe $y$ into a drain with which it may be connected, and sediment and heavy waste products may be removed through the opening at the bottom of the chamber by removing the plug.

If the kettle is to be used as a water-kettle, the steam inlet $t$ and the outlets $u$ will be stopped.

I claim—

1. The combination with a kettle of a rotating pan or dish-support, substantially as described.

2. The rotating dish-support in combination with the pans adapted to contain articles to be cooked or warmed, substantially as described.

3. The kettle provided with a groove, and the lid provided with a lip to form a water-joint, in combination with a valve, to operate substantially as described.

4. The kettle in combination with the chamber $v$, provided with plugged opening, diaphragm, and outlet $y$, substantially as described.

In testimony whereof I have signed my name to this specification in the presence of two subscribing witnesses.

GEO. W. WALKER.

Witnesses:
 G. W. GREGORY.
 S. B. KIDDER.